(12) United States Patent
Schlesener et al.

(10) Patent No.: US 8,310,825 B2
(45) Date of Patent: Nov. 13, 2012

(54) PORTABLE COMPUTING DEVICE WITH WIRELESS CAPABILITY WHILE IN FOLDED POSITION

(75) Inventors: Maria C. Schlesener, Austin, TX (US); Indu Ramamurthi, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 521 days.

(21) Appl. No.: 12/574,965

(22) Filed: Oct. 7, 2009

(65) Prior Publication Data

US 2011/0080703 A1 Apr. 7, 2011

(51) Int. Cl.
*G06F 1/16* (2006.01)

(52) U.S. Cl. ............... 361/679.27; 361/679.26; 343/702; 343/720; 343/872

(58) Field of Classification Search ............... 361/679.27
See application file for complete search history.

(56) References Cited

U.S. PATENT DOCUMENTS

| | | | |
|---|---|---|---|
| 5,138,328 A | 8/1992 | Zibrik et al. | |
| 5,684,672 A | 11/1997 | Karidis et al. | |
| 5,870,282 A * | 2/1999 | Andre et al. | 361/679.57 |
| 6,853,336 B2 | 2/2005 | Asano et al. | |
| 7,679,893 B2 * | 3/2010 | Lam et al. | 361/679.26 |
| 2009/0009947 A1 * | 1/2009 | Lam et al. | 361/681 |
| 2009/0315788 A1 * | 12/2009 | Hirota | 343/702 |
| 2010/0067186 A1 * | 3/2010 | Aya et al. | 361/679.28 |
| 2011/0115735 A1 * | 5/2011 | Lev et al. | 345/173 |

* cited by examiner

*Primary Examiner* — Anthony Q Edwards

(74) *Attorney, Agent, or Firm* — Larson Newman, LLP

(57) ABSTRACT

A portable computing device includes a display unit and a base unit coupled via a hinge such that a surface of the display unit is parallel to a surface of the display unit when the portable computing device is manipulated into a folded position. The display unit includes a display panel and a radiating element of an antenna, the radiating element disposed at an end of the display unit that is distal to the hinge. The base unit includes one or more information handling components and a metal base chassis, the metal base chassis defining a keep out aperture at a distal end of the base unit that is substantially devoid of metal material from the metal base chassis. The keep out aperture is axially displaced from a position of the radiating element when the portable computing device is manipulated into the folded position.

20 Claims, 6 Drawing Sheets

PORTABLE COMPUTING DEVICE WITH WIRELESS CAPABILITY WHILE IN FOLDED POSITION

FIELD OF THE DISCLOSURE

This disclosure relates to portable computing devices having integrated antennas.

BACKGROUND

As the value and use of information continues to increase, individuals and businesses seek additional ways to process and store information. One option is a portable computing device. A portable computing device generally processes, compiles, stores, and/or communicates information or data for business, personal, or other purposes. Because technology and information handling needs and requirements can vary between different applications, portable computing devices can also vary regarding what information is handled, how the information is handled, how much information is processed, stored, or communicated, and how quickly and efficiently the information can be processed, stored, or communicated. Portable computing devices can include a variety of hardware and software components that can be configured to process, store, and communicate information and can include one or more computing systems, data storage systems, and networking systems. Portable computing devices with wireless communications capabilities also are known.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
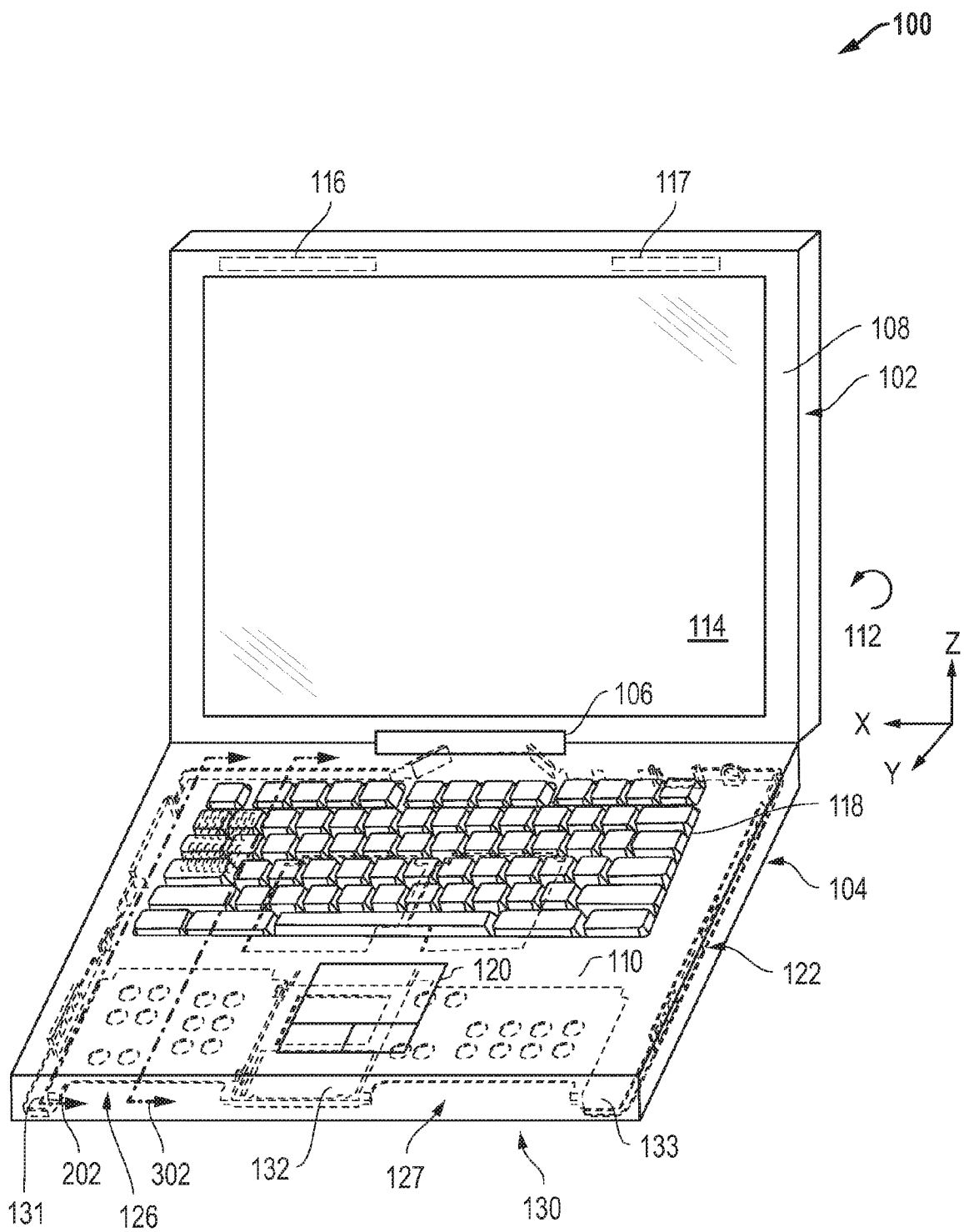
FIG. 1 illustrates a portable computing device having a metal base chassis configured so as to minimize interference with integrated antennas while the portable computing device is in a folded position according to one aspect of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, a portable computing device can include any portable instrumentality (that is, an instrumentality powered by a battery, photovoltaic array, or other portable power source) operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a portable computing device can be a notebook (or "laptop") computer, a portable tablet computer, a personal digital assistant (PDA), or a cellular phone. The portable computing device can include memory, one or more processing resources such as a central processing unit (CPU) or hardware or software control logic, and a display panel. Additional components of the portable computing device can include one or more storage devices, one or more communications ports for communicating with external devices as well as various input and output (I/O) devices, such as a keyboard, a mouse, and a video display. The portable computing device can also include one or more buses operable to transmit communications between the various hardware components.

FIGS. 1-8 illustrate example implementations of a portable computing device that enables wireless communications via one or more embedded antennas. The portable computing device includes a display unit and a base unit connected via a hinge such that the portable computing device can be manipulated into a folded position whereby a major surface of the display unit is parallel to, and adjacent to, an opposing major surface of the base unit. The display unit includes a housing containing a display panel and one or more radiating elements for one or more antennas. The base unit includes a plastic housing enclosing a metal base chassis and one or more information handling components, such as one or more central processing units (CPUs), batteries or other portable power sources, input/output (I/O) interfaces, user input devices (such as a trackpad), and the like. In embodiment, the one or more radiating elements are disposed within the display unit at an end of the display unit distal to the hinge such that when the display housing is in the folded position, the one or more radiating elements are proximate to the top surface of the base unit at an end region of the base unit distal to the hinge. Accordingly, to prevent interference with the radiating elements, the metal base chassis defines one or more keep out apertures at the distal end of the base unit, each keep out aperture being axially displaced from a position of a corresponding radiating element (or set of proximate radiating elements) when the portable computing device is in the folded position and whereby each keep out aperture is substantially devoid of metal from the metal base chassis such that the metal base chassis does not extend into a predetermined minimum clearance region of the position of each radiating element when the portable computing device is in the folded position. With the metal base chassis so configured, the portable computing device can continue to enable wireless communications via the one or more radiating elements while the portable computing device is in the folded position. This ability to continue to wirelessly communicate while in the folded position can allow a portable communication device to support wireless docking or allow a portable communications device implementing a tablet display panel to support wireless communications while the tablet display panel is folded adjacent to the base unit.

FIG. 1 illustrates a portable computing device 100 in accordance with at least one embodiment of the present disclosure. In the depicted example, the portable computing device 100 comprises a notebook computer illustrated in an open position. Cross-sectional views of the notebook computer of FIG. 1 in a folded position are provided in FIGS. 2 and 3. The notebook computer includes a display unit 102 and a base unit 104 mechanically coupled via a hinge 106. The hinge 106 mechanically attaches to the display unit 102 at one end of the display unit 102 (hereinafter, "the hinge end" of the display unit 102) and mechanically attaches to the base unit 104 at one end of the base unit 104 (hereinafter, "the hinge end" of the base unit 104). The hinge 106, the display unit 102, and the base unit 104 are configured so that the portable computing device 100 can be manipulated into a folded position such that a front surface 108 of the display unit 102 is both parallel to and facing a top surface 110 of the base unit 104. For a notebook whereby the hinge 106 comprises a piano-type hinge, the folded position typically would include a close position whereby the display panel of the display unit is facing the keyboard. In instances whereby the display unit 102 comprises a tablet display panel, the hinge 106, the display unit 102, and the base unit 104 can be configured so that the display unit 102 can be manipulated so as to rotate and fold the display unit 102 such that a back surface 112 of the display unit 102 is both parallel to and facing the top surface 110 of the base unit 104 (that is, in a tablet position) or such that the display panel is facing the keyboard (that is, the closed position). Reference to the folded position therefore includes both the closed position and the table position.

The portable computing device 100 includes a display panel 108 disposed at the display unit 102 so as to project imagery from the front surface 108 when in operation. The display panel 108 can include a tablet display panel that receives user input via tactile manipulation of a surface of the tablet display panel. The display unit 102 further includes one or more radiating elements (such as radiating elements 116 and 117) of one or more antennas, which preferably are disposed in the display unit 102 at an end portion of the display unit 102 that is distal to the hinge 106. The portable computing device 100 further includes one or more information handling components disposed at the base unit 104, such as a keyboard 118, a trackpad 120, one or more CPUs (not shown), one or more disc drives (not shown), one or more I/O interfaces (not shown), and the like. The portable computing device 100 also includes a metal base chassis 122 disposed in the base unit 104 so as to provide structural support to the base unit 104 and to provide a set of attachment points for the information handling components of the base unit 104. The metal base chassis 122 may be composed of any of a variety of metals or combinations of metals, such as magnesium, aluminum, zinc, steel, or plastics having a metal plating or copper sputtering layer.

In at least one embodiment, the metal base chassis 122 substantially extends from the hinge end of the base unit 104 to the distal end of the base unit so as to maximize the structural rigidity and support provided by the metal base chassis 122. To illustrate, the example notebook computer illustrated in FIG. 1 may employ palm rest regions at the top surface 110 of the base unit 104 that are adjacent to the keyboard 118 and to the trackpad 120 so as to permit a user to rest the user's hands on the top surface 110 while typing using the keyboard or while manipulating the trackpad. The weight of the user's hands places considerable force on the top surface 110 and thus it can be advantageous to configure the metal base chassis 122 to support the base unit 104 in these palm rest regions to some degree so as to avoid distortion of the housing of the base unit 104 or other destructive effects from the weight of the user's hands.

However, while it is advantageous to extend the metal base chassis 122 to the distal end of the base unit 104 for structural support, this configuration can lead to interference with the operation of the radiating elements disposed in the display unit 102 when the portable computing device 100 is manipulated into the folded position. Because the radiating elements are disposed at the distal end of the display unit 102, when the display unit is in the folded position the radiating elements are brought into positions in proximity with the distal end of the base unit 102. Accordingly, there would be potential for metal from the metal base chassis 122 located in the end region of the base unit 102 to interfere with the radiation pattern of the radiating elements. To mitigate any potential interference, the metal base chassis 122 is configured so as to define a keep out aperture at the distal end of the base unit 104 for each radiating element (or each set of proximate radiating elements). Each keep out aperture comprises a channel, indentation, or other opening that is axially displaced (along the vertical axis, or z-axis) from the position of the corresponding radiating element (or proximate set of radiating elements) when the portable computing device 100 is in the folded position and whereby each keep out aperture is substantially devoid of any metal from the metal base chassis 122. Further, each keep out aperture can be sized so as to avoid any extension of metal from the metal base chassis 122 into a minimum clearance region defined by the position of the corresponding radiating element (or proximate set of radiating elements) when the portable computing device 100 is in the folded position.

To illustrate, in the example of FIG. 1 the portable computing device 100 includes radiating elements 116 and 117 disposed at the distal end of the display unit 102 such that the radiating elements are positioned on opposing sides of the trackpad 120 and near the distal end of the base unit 104 when the display unit is manipulated into the folded position. Accordingly, the metal base chassis 122 can define keep out apertures 126 and 127 so as to avoid substantially impeding the electromagnetic (EM) signal propagating from the radiating elements 116 and 117 when the antennas associated with the radiating elements are operated to conduct wireless communications while the portable computing device 100 is in the folded position. The keep out aperture 126 is sized so as to be at least as extensive as a minimum clearance region defined by the radiating element 116, the minimum clearance region identified as the minimum distance needed between the edges of the radiating element and the metal of the metal base chassis 122 so as to allow at least a minimum degree of EM propagation by the radiating element. The minimum degree of EM propagation can be defined by an applicable standard (such as a standard set by the Cellular Telecommunications Industry Association), identified via experimentation, based on information provided by a manufacturer or supplier of the radiating element, and the like. The keep out aperture 127 is similarly configured with respect to the radiating element 117. Note that although the keep out apertures 126 and 127 are illustrated as substantially similar in dimension, the keep out apertures defined by the metal base chassis 122 can be of different dimensions depending on, for example, the properties of the corresponding radiating elements or the particular structural requirements of the base unit 104.

In the example of FIG. 1, the metal base chassis 122 is formed so as to parallel the top surface 110 of the base unit 104 with flanges substantially parallel to the front surface and side surfaces of the base unit 104. Accordingly, the keep out apertures 126 and 127 can be formed as channels or indentations in the metal base chassis 122 that extend from a bottom surface 130 of the base unit 104 up to respective points parallel with the top surface 110 so as to form flange portions 131, 132, and 133 at the distal end of the base unit 104. As such, the flange portions 131, 132, and 133 continue to allow the metal base chassis 122 to provide structural support at the distal end of the base unit 104 while the corresponding keep out apertures 126 and 127 allow the radiating elements 116 and 117 to radiate sufficiently while the portable computing device 102 is in the folded position. In another embodiment, the keep out apertures 126 and 127 can be defined as holes or other openings in the metal base chassis 122 local to the positions of the radiating elements 116 and 117, respectively, while the display unit 102 is folded to the base unit 104 such that the metal base chassis 122 extends continuously across the bottom edge of the front side of the base unit 104.

Figure 2:
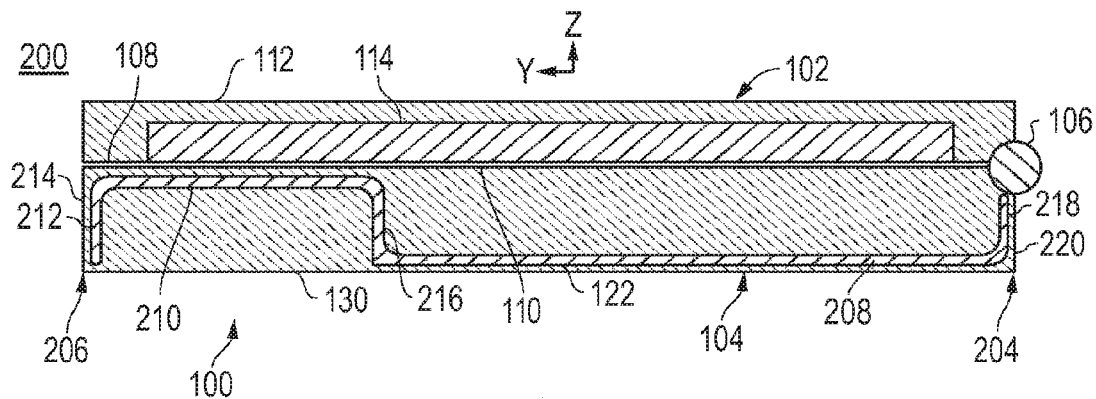
FIG. 2 illustrates a cross-sectional view of the portable computing device in the folded position according to one aspect of the present disclosure.
Figure 3:
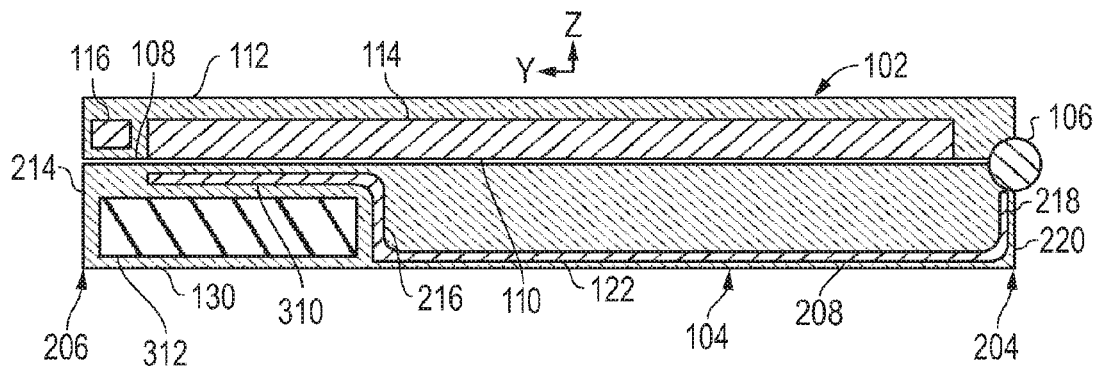
FIG. 3 illustrates another cross-sectional view of the portable computing device in the folded position according to one aspect of the present disclosure.

FIGS. 2 and 3 illustrate cross-sectional views of the portable computing device 100 of FIG. 1 in accordance with at least one embodiment of the present disclosure. FIG. 2 illustrates a cross-sectional view 200 of the portable computing device 100 (while in the folded position) along a plane 202 (FIG. 1) normal to the top surface 110 of the base unit 104 and extending through the flange portion 131. FIG. 3 illustrates a cross-sectional view 300 of the portable computing device 100 (while in the folded position) along a plane 302 (FIG. 1) normal to the top surface 110 of the base unit 104 and extending through the keep out aperture 126. As illustrated by FIG. 2, the metal base chassis 122 at plane 202 extends from a hinge end 204 of the base unit 104 to a distal end 206 of the base unit 104 with a metal region 208 disposed proximate to, and substantially parallel with, the bottom surface 130 of the base unit 104; a metal region 210 disposed proximate to, and substantially parallel with, the top surface 110; a metal region 212 disposed proximate to, and substantially parallel with, a front surface 214 of the base unit 104; a metal region 216 connecting the metal regions 208 and 210; and a metal region 218 disposed proximate to, and substantially parallel with, a rear surface 220 of the base unit 104. The metal region 212 forms the flange portion 131 at the distal end of the base unit 104 and the metal region 218 forms a flange portion at the hinge end of the base unit 104 (and which may be used to attach to, or otherwise support, the hinge 106). As illustrated by FIG. 3, the metal base chassis 122 at plane 302 includes the metal portions 208, 216, and 218. However, at plane 302 the metal base chassis 122 does not extend the full length of the base unit 104 from the hinge end 204 to the distal end 206, but rather terminates prior to a predefined clearance region defined by the radiating element 116 (the predefined clearance region is described below in greater detail with reference to FIG. 4). Accordingly, at plane 302 the metal base chassis 122 does not include the metal portions 210 and 212, but rather includes a metal portion 310 that is proximate to, and substantially parallel with, the top surface 110, whereby the metal portion 310 is shorter in extent than the metal portion 210 and does not extend into a predefined clearance region positioned with respect to the radiating element 116.

Figure 4:
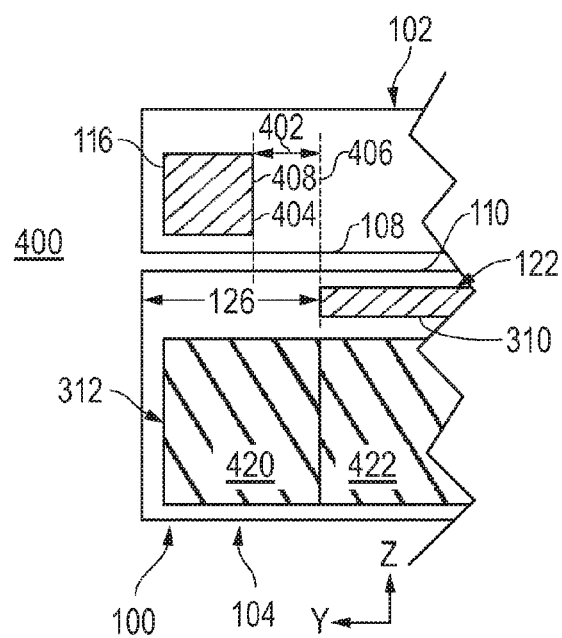
FIG. 4 illustrates an enlarged view of a portion of FIG. 3 according to one aspect of the present disclosure.

FIG. 4 illustrates an expanded view 400 of a front region of the cross-sectional view 300 of FIG. 3 in accordance with at least one embodiment of the present disclosure. As described above, the metal base chassis 122 is formed so as to define the keep out aperture 126 for the radiating element 116 such that when the display unit 102 is folded parallel to the base unit 104, substantially no metal from the metal base chassis 122 extends into a minimum clearance region defined by the position of the radiating element 116 when the portable computing device 100 is in the folded position. The particular dimensions of the minimum clearance region can be determined based on a variety of factors, including the physical properties and dimensions of the radiating element 116, the power or frequency of the radiated signal, and the like. As noted above, the minimum clearance region can be defined by a standard or protocol, identified based on experimentation, supplied by another party, and the like. In the example of FIG. 4, the antenna incorporating the radiating element 116 is configured so as to focus the radiation away from the base unit 104 (that is, focus the radiation in the direction of the y-axis). Accordingly, the minimum clearance region is defined as a minimum distance relative to the edges of the radiating element 116. In the illustrated example, the minimum clearance region includes a minimum clearance dimension 402 from an edge 404 of the radiating element 116 that faces the hinge end 204 such that the minimum clearance dimension 402 is maintained so long as the keep out aperture 126 does not extend beyond a plane 406 that is parallel to a plane 408 defining the edge 404 of the radiating element 126 and that is displaced from the plane 408 by the minimum clearance dimension 402. The inventors have determined that a value of at least 1 millimeter (mm) for the minimum clearance dimension 402 in this context can provide a sufficient clearance region so as to permit the radiating element 116 to continue to effectively radiate in accordance with one or more conventional test requirements when the portable computing device 100 is configured into the folded position. To this end, the inventors also have determined that a keep out aperture with the dimensions of about 10 mm along the x-axis and about 5 mm along the y-axis can provide satisfactory results for wireless wide area network (WWAN) and wireless local area network (WLAN) applications in a notebook computer or tablet computer context for that particular antenna design and technology requirement.

Figure 5:
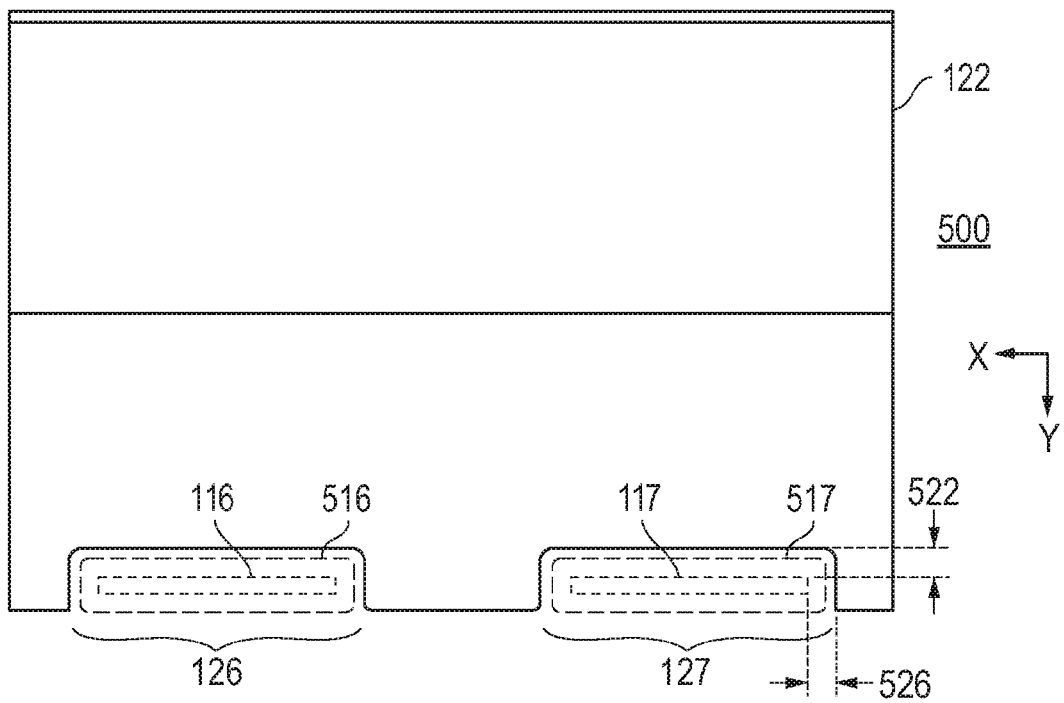
FIGS. 5 and 6 illustrate a top view of the metal base chassis of the portable computing device of FIG. 1 according to one aspect of the present disclosure.
Figure 6:
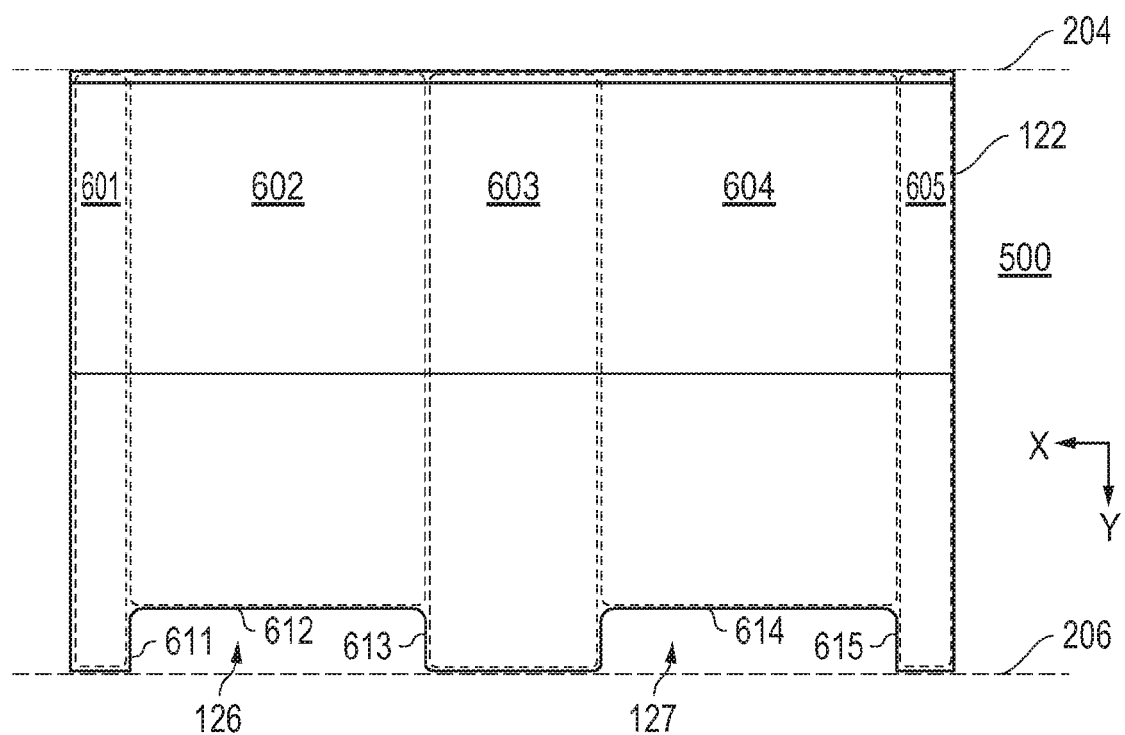

FIGS. 5 and 6 illustrate a top view 500 of the metal base chassis 122 of the portable computing device 100 in accordance with at least one embodiment. As illustrated by FIG. 5, the metal base chassis 122 is formed so as to define the keep out apertures 126 and 127. The keep out aperture 126 is substantially co-located with the radiating element 116 along the horizontal axes (that is, the x-axis and the y-axis) and axially displaced from the radiating element 116 along the vertical axis (that is, the z-axis) when the portable computing device 100 is in the folded position. The keep out aperture 127 is substantially co-located with the radiating element 117 along the horizontal axes and axially displaced from the radiating element 117 along the vertical axis. Further, the keep out aperture 126 is dimensioned so that the keep out aperture 126 does not extend into a minimum clearance region 516 defined by the position of the radiating element 116 when the display unit 102 is folded adjacent to the base unit 104. Likewise, the keep out aperture 127 is dimensioned so that the keep out aperture 127 does not extend into a minimum clearance region 517 defined by the position of the radiating element 117 when the display unit 102 is folded adjacent to the base unit 104. That is, the metal base chassis 122 is formed to include channels, indentations, or other openings corresponding to the keep out apertures 126 and 127 such that substantially no metal from the base metal chassis 122 extends into the minimum clearance regions 516 and 517 defined by the positions of the radiating elements 116 and 117 when the portable computing device 100 is in the folded position.

Figure 7:
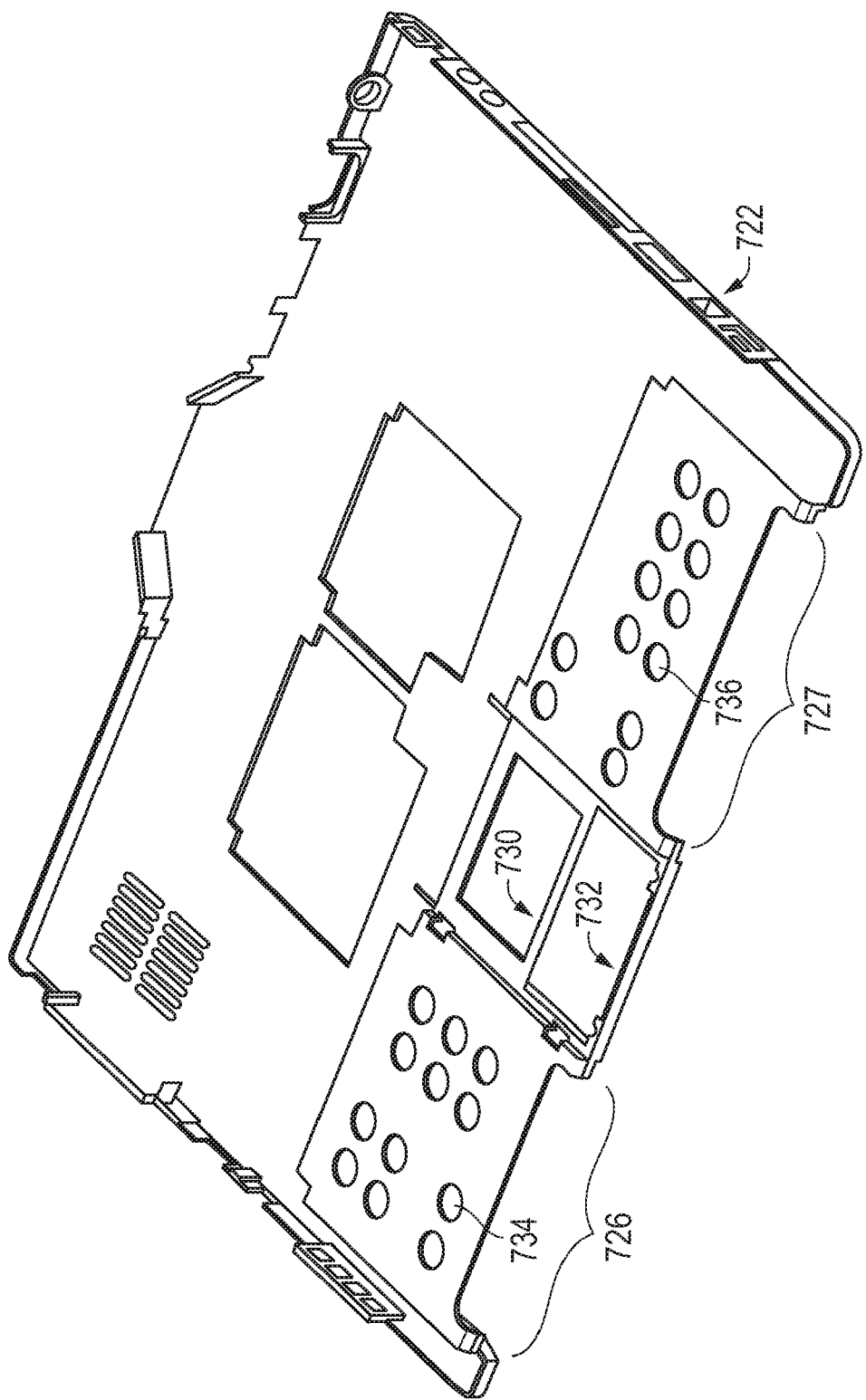
FIG. 7 illustrates a plan view of the top of an example metal base chassis for implementation in a notebook computer according to one aspect of the present disclosure.

FIG. 6 depicts the top view 500 of FIG. 5 in greater detail. As illustrated by FIG. 7, the metal base chassis 122 is composed of a plurality of portions, including portions 601-605. Portion 601 abuts portion 602 and portion 602 abuts, and is disposed between, portions 601 and 603. Portion 603 abuts, and is disposed between, portions 602 and 604. Portion 604 abuts, and is disposed between, portions 603 and 605. Portion 605 abuts portion 604. Portion 601 extends along the y-axis for a length $L_1$, portion 602 extends along the y-axis for a length $L_2$, portion 603 extends along the y-axis for a length $L_3$, portion 604 extends along the y-axis for a length $L_4$, and portion 605 extends along the y-axis for a length $L_5$. In at least one embodiment, the lengths $L_2$ and $L_4$ are less than the lengths $L_1$, $L_3$, and $L_5$ such that the keep out aperture 126 is defined by the edge 611 of the portion 601, the edge 612 of the portion 602, and the edge 613 of the portion 603 and such that the keep out aperture 127 is defined by the edge 613 of the portion 603, the edge 614 of the portion 604, and the edge 615 of the portion 605. Note that although FIG. 6 illustrates the portions 601, 603, and 605 as extending equally from proximate to the hinge edge 204 to proximate to the distal edge 206 (that is, illustrating the lengths $L_1$, $L_3$, and $L_5$ as substantially equal), implementations of the base metal chassis 122 are not limited to this particular implementation and thus the portions 601, 603, and 605 may be of different lengths. Likewise, although FIG. 6 illustrates the portions 602 and 604 as extending equally from the hinge end 204 to a plane short of the distal end 206 (that is, illustrating the lengths $L_2$ and $L_4$ as substantially equal), implementations of the base metal chassis 122 are not limited to this particular implementation and thus the portions 602 and 604 may be of different lengths.

Figure 8:
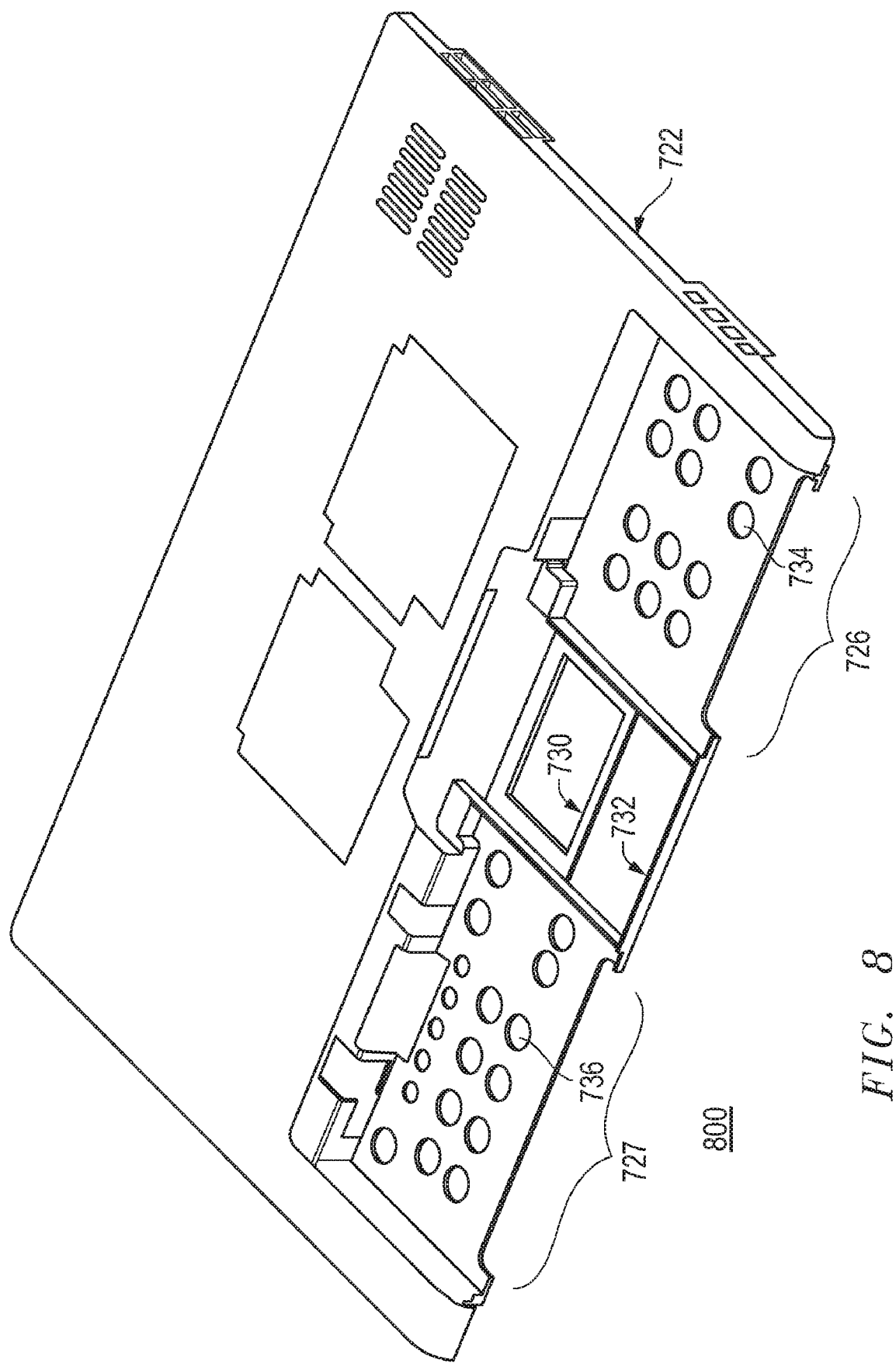
FIG. 8 illustrates a plan view of the bottom of the example metal base chassis of FIG. 6 according to one aspect of the present disclosure.
Figure 9:
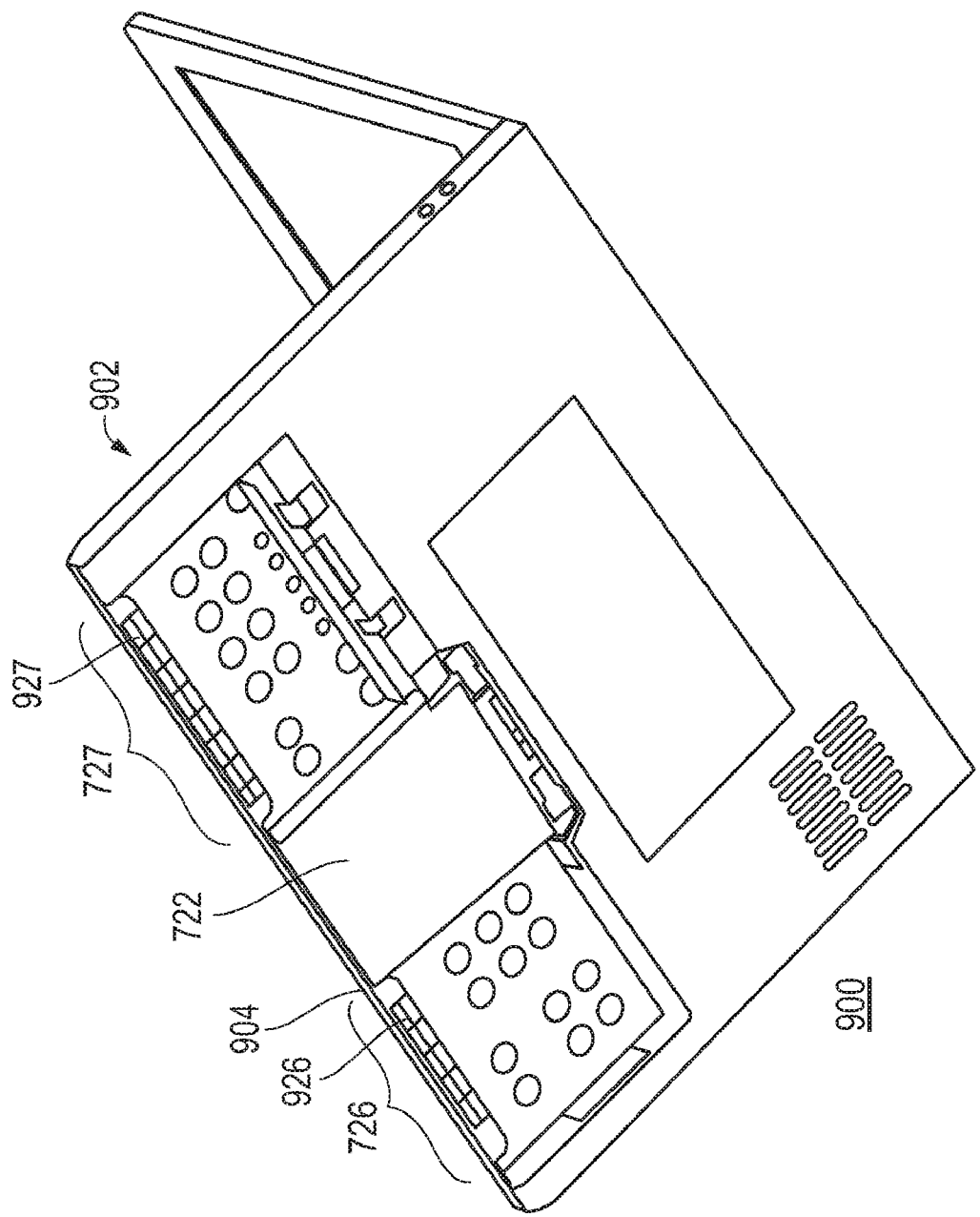
FIG. 9 illustrates a plan view of the bottom of a notebook computer implementing the metal base chassis of FIGS. 7 and 8 according to one aspect of the present disclosure.

FIGS. 7 and 8 illustrate a top perspective view 700 and a bottom perspective view 800, respectively, of an example implementation of a metal base chassis 722 in accordance with at least one embodiment of the present disclosure. As shown, the metal base chassis 722 includes keep out apertures 726 and 727 (corresponding to the keep out apertures 126 and 127), as well as an aperture 730 for a trackpad, an aperture 732 for mouse buttons, one or more cooling apertures (such as apertures 734 and 736), as well as various structures related to information handling components of the portable computing device in which the metal base chassis 722 is implemented. The cooling apertures also may facilitate EM propagation from the radiating elements. FIG. 9 illustrates a bottom perspective view 900 of a notebook computer 902 in which the metal base chassis 722 is implemented. As shown in FIG. 9, the plastic housing disposed at the top surface of the base unit of the notebook computer 902 can include plastic ribbing on the underside of the plastic housing in the regions of the plastic housing coextensive with the keep out apertures 726 and 727 (such as plastic ribbing 926 for keep out aperture 726 and plastic ribbing 927 for keep out aperture 727) so as to provide additional structural support to the plastic housing to compensate for the absence of support from the metal base chassis 722 in these regions.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A portable computing device comprising:
    a display unit and a base unit coupled via a hinge such that a surface of the display unit is parallel to a surface of the base unit when the portable computing device is manipulated into a folded position;
    the display unit comprising a display panel and a radiating element of an antenna, the radiating element disposed at an end of the display unit that is distal to the hinge; and
    the base unit comprising one or more information handling components and a metal base chassis, the metal base chassis defining a keep out aperture at an end of the base unit that is distal to the hinge, the keep out aperture being axially displaced from a position of the radiating element when the portable computing device is manipulated into the folded position, and the keep out aperture being substantially devoid of metal material from the metal base chassis, wherein a portion of the metal base chassis extends to an end of the keep out aperture that is distal to the hinge.

2. The portable computing device of claim 1, wherein the portable computing device comprises a notebook computer.

3. The portable computing device of claim 2, wherein the display panel comprises a tablet display panel.

4. The portable computing device of claim 1, wherein the portable computing device is configured to conduct wireless communications via the antenna when the portable computing device is configured in the folded position.

5. The portable computing device of claim 1, wherein the base unit further comprises a plastic housing substantially enclosing the metal base chassis, the plastic housing comprising plastic ribbing on an underside of the plastic housing in a region corresponding to the keep out aperture of the metal base chassis.

6. The portable computing device of claim 1, wherein the radiating element has a predetermined minimum clearance region defined by the position of the radiating element when the portable computing device is manipulated into the folded position and wherein the keep out aperture is positioned so that substantially no metal from the metal base chassis extends into the predetermined minimum clearance region.

7. The portable computing device of claim 6, wherein the predetermined minimum clearance region is defined as a region extending not less than 1 millimeter from an edge of the radiating element that faces the hinge.

8. The portable computing device of claim 1, wherein the radiating element is configured to focus an electromagnetic signal toward the end of the base unit distal to the hinge.

9. The portable computing device of claim 1, wherein the metal base chassis is composed of at least one of magnesium, aluminum, steel, or zinc.

10. The portable computing device of claim 1, wherein the keep out aperture has a dimension of about 10 millimeters in a direction parallel with the end of the base unit distal to the hinge and a dimension of about 5 millimeters in a direction perpendicular to the end of the base unit distal to the hinge.

11. A metal base chassis for implementation in a base unit of a portable computing device, the metal base chassis comprising:
    a first region extending a first length from a first end of the metal base chassis that corresponds to a first end of the base unit;

a second region extending a second length from the first end of the metal base chassis; and a third region disposed between and abutting the first region and the second region, the third region extending a third length from the first end of the metal base chassis, the third length substantially less than the first length and the second length;

a first edge of the first region, a second edge of the second region, and a third edge of the third region defining a keep out aperture at a second end of the metal base chassis opposite to the first end, the keep out aperture being substantially devoid of metal material from the metal base chassis and being located at the metal base chassis such that the keep out aperture is axially displaced from a position of a radiating element of an antenna disposed in a display unit of the portable computing device in which the metal base chassis is installed when the portable computing device is manipulated into a folded position, wherein the first region, the second region, and the third region are substantially rectangular in a top view of the metal base chassis.

12. The metal base chassis of claim 11, wherein the radiating element has a predetermined minimum clearance region defined by the position of the radiating element when the portable computing device is manipulated into the folded position and wherein the keep out aperture is positioned so that substantially no metal from the metal base chassis extends into the predetermined minimum clearance region.

13. The metal base chassis of claim 12, wherein the predetermined minimum clearance region is defined as a region extending not less than 1 millimeter from an edge of the radiating element that faces the first end of the base unit.

14. The metal base chassis of claim 11, wherein the metal base chassis is composed of at least one of magnesium, aluminum, steel, or zinc.

15. The metal base chassis of claim 11, wherein the keep out aperture has a dimension of about 10 millimeters in a direction parallel with the second end of the base unit and a dimension of about 5 millimeters in a direction perpendicular to the second end of the base unit.

16. A method comprising:

providing a portable computing device comprising a display unit and a base unit coupled via a hinge such that a surface of the display unit is parallel to a surface of the base unit when the portable computing device is manipulated into a folded position, wherein the display unit comprises a display panel and a radiating element of an antenna, the radiating element disposed at an end of the display unit that is distal to the hinge, and wherein the base unit comprises one or more information handling components and a metal base chassis, the metal base chassis defining a keep out aperture at an end of the base unit distal to the hinge, the keep out aperture being axially displaced from a position of the radiating element when the portable computing device is manipulated into the folded position and the keep out aperture being substantially devoid of metal material from the metal base chassis, wherein as portion of the metal base chassis extends to au end of the keep out aperture that is distal to the hinge; and conducting wireless communications using the antenna while the portable computing device is in the folded position.

17. The method of claim 16, wherein the portable computing device comprises a notebook computer.

18. The method of claim 16, wherein the base unit further comprises a plastic housing substantially enclosing the metal base chassis, the plastic housing comprising plastic ribbing on an underside of the plastic housing in a region corresponding to the keep out aperture of the metal base chassis.

19. The method of claim 16, wherein the radiating element has a predetermined minimum clearance region defined by the position of the radiating element when the portable computing device is manipulated into the folded position and wherein the keep out aperture is positioned so that substantially no metal from the metal base chassis extends into the predetermined minimum clearance region.

20. The method of claim 16, wherein the radiating element is configured to focus an electromagnetic signal toward the end of the base unit distal to the hinge.

* * * * *